July 18, 1967  E. F. WADELTON  3,331,450
SINGLE GAUGE WHEEL FOR A TWO-WAY PLOW
Filed Feb. 4, 1965  2 Sheets-Sheet 1
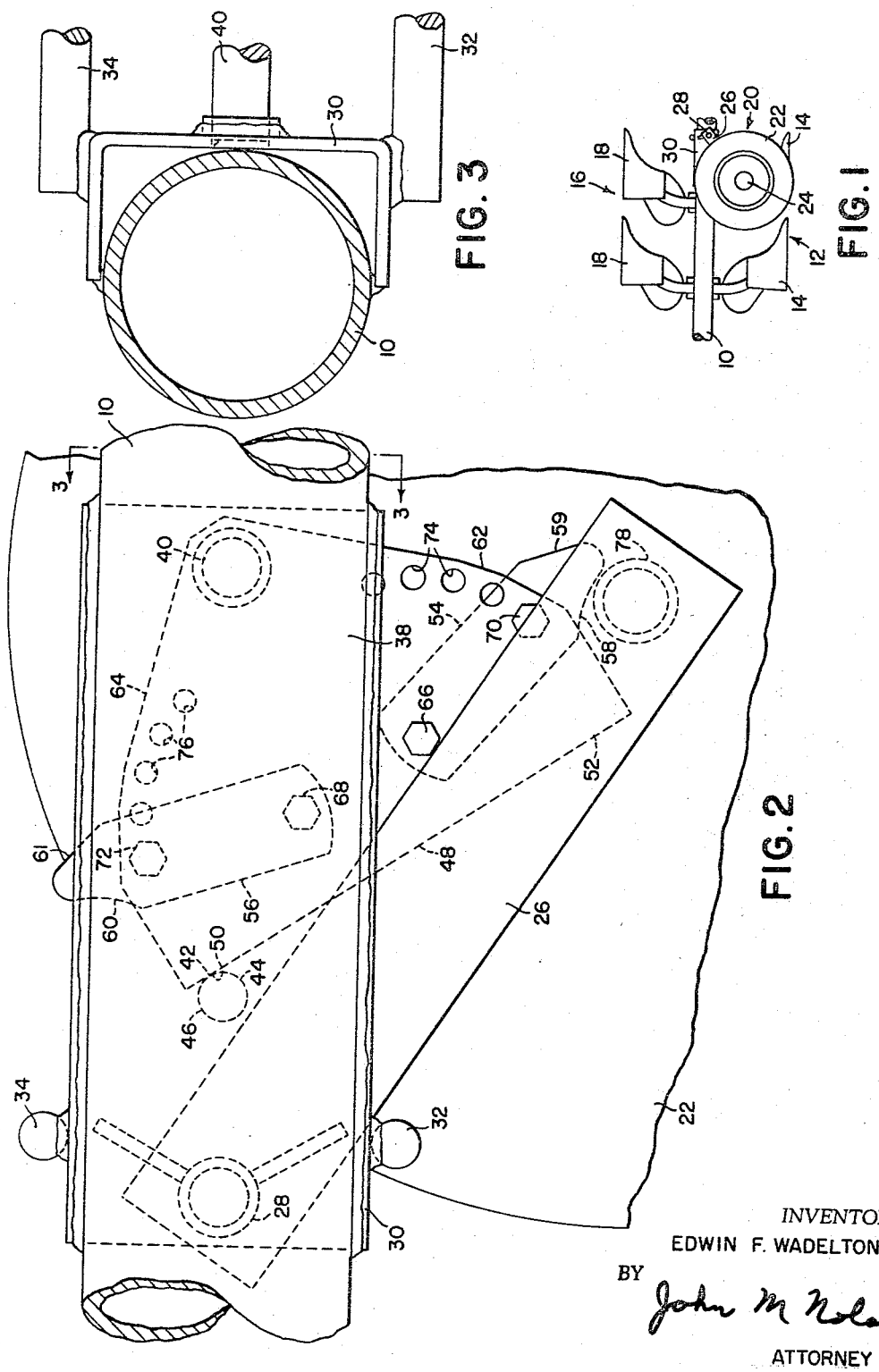
INVENTOR.
EDWIN F. WADELTON
BY John M Nolan
ATTORNEY July 18, 1967     E. F. WADELTON     3,331,450
SINGLE GAUGE WHEEL FOR A TWO-WAY PLOW
Filed Feb. 4, 1965     2 Sheets-Sheet 2

INVENTOR.
EDWIN F. WADELTON
BY
John M. Nolan
ATTORNEY 3,331,450
SINGLE GAUGE WHEEL FOR A TWO-WAY PLOW
Edwin F. Wadelton, Corona Del Mar, Calif., assignor to Deere & Company, Moline, Ill., a corporation of Delaware
Filed Feb. 4, 1965, Ser. No. 430,377
5 Claims. (Cl. 172—212)

ABSTRACT OF THE DISCLOSURE

A two-way plow having alternately usable right- and left-hand plow units mounted on a frame that is selectively rotatable about a fore-and-aft axis to dispose either plow unit in operating position and a single gauge wheel that is automatirally positioned to regulate the plowing depth when either plow unit is used.

This invention relates to two-way plows and more particularly to a single-gauge wheel for such plows, which automatically is positioned to regulate the operating depth of either plow unit.

A conventional two-way plow has alternately usable right- and left-hand plow units for directing a furrow slice in either lateral direction. The plow units are conventionally disposed on opposite sides of the plow frame and are alternately positioned for operation by rotating the frame about an axis extending in the direction of machine travel through power means selectively controlled by the operator.

Such plows also conventionally include a gauge means which supports the frame a predetermined distance from the ground to regulate the operating depth of either plow unit.

The present invention is an improvement in such gauge means and provides a novel mounting for a single-gauge wheel whereby the wheel is automatically positioned to regulate the plowing depth when either plow unit is used.

Accordingly, the primary object of the present invention is to provide improvement mounting means for a single-gauge wheel on a two-way plow whereby the gauge wheel is automatically positioned to control the depth of either plow unit.

A more specific object is to provide such a mounting means which is gravity actuated to position the gauge wheel for operation upon rotation of the plow frame to position either plow unit for operation.

Another object is to provide such a mounting mechanism in which the height of the gauge wheel relative to the plow frame is adjustable to allow selective adjustment of the operating depth of the plow.

Still another object is to provide such a mounting mechanism having relatively few parts, and which is of simple and rugged construction to provide trouble-free operation of the gauge wheel.

These and other objects will become apparent from a consideration of the following detailed description and drawings wherein:

FIG. 1 is a side elevation view of a portion of a typical two-way plow, including a gauge wheel.

FIG. 2 is an enlarged elevation view of the mounting mechanism for the gauge wheel.

FIG. 3 is a section view of the plow frame taken along the line 3—3 of FIG. 2.

Figure 4:
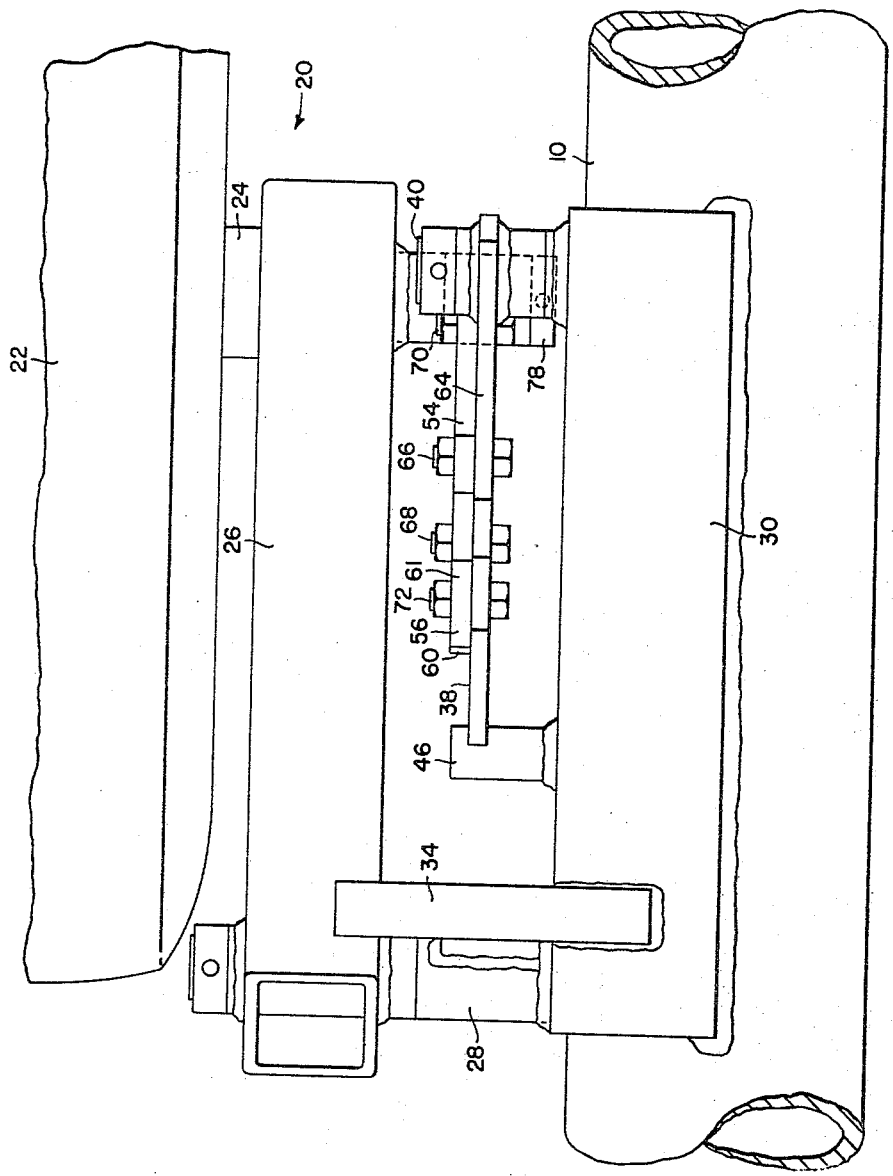
FIG. 4 is a plan view of the mounting mechanism shown in FIG. 2.

In the drawings, there is shown a two-way plow having a main frame 10 adaptable to be mounted on a draft vehicle (not shown) for pulling the plow forwardly (to the right in FIG. 1). A right-hand plow unit 12 includes a plurality of plow bottoms 14 rigidly affixed to the frame 10, each plow bottom directing the plowed ground toward the right when facing the direction of machine travel. A left-hand plow unit 16 is a mirror image of the right-hand plow unit 12 and includes a plurality of plow bottoms 18 rigidly attached to the opposite side of the frame 10 from the right-hand plow bottoms 14 and extending in the opposite direction. The plow bottoms 18 direct the plowed ground toward the left when facing the direction of machine travel.

Although only two plow bottoms are shown in each plow unit, the length of the frame can be varied to accommodate additional plow bottoms for each unit.

The frame 10 is rotatable about its longitudinal axis, which extends in the direction of machine travel, the rotation of the frame being accomplished through conventional power means (not shown) selectively actuated by the operator to place the desired plow unit in the downwardly disposed operating position. In FIG. 1, the right-hand plow unit 12 is disposed in the plowing position. The entire plow is selectively raised or lowered by a suitable power-lift mechanism (not shown) mounted on the draft vehicle and operably connected to the frame 10.

A gauge means, indicated generally by the numeral 20, engages the group when the plow is positioned for and supports the frame at a predetermined distance from the ground to regulate the depth of plow penetration. The gauge means 20 includes a gauge wheel 22 rotatably mounted on an axle 24, which extends horizontally transverse to the direction of machine travel when the plow is positioned for operation. The axle 24 is carried at one end of an arm 26 having its other end pivotally mounted on a shaft 28, which extends parallel to the axle 24 for rocking movement of the arm in a longitudinal vertical arc about the shaft 28. The shaft 28 is mounted on a frame member 30 which forms an integral part of the frame 10.

The rocking movement of the arm 26 about the shaft 28 is limited between a pair of stops 32 and 34 in the form of parallel shafts which project from opposite of the frame member 30 into the path of the arm 26. When the plow is in a raised position, the arm 26 and consequently the gauge wheel 22 is supported by whichever stop is in the lower position. When the frame is rotated to position the right-hand plow unit for operation, as shown in FIGS. 1 and 2, the stop 32 is in the lower position and engages the arm 26 to support the gauge wheel above the ground when the entire plow is raised.

When the plow is lowered into operating position and the gauge wheel 22 contacts the ground, the upward movement of the arm 26 is limited by a locking means 36 mounted on the frame 10, whereby the gauge wheel 22 supports the frame 10 a predetermined distance from the ground to control the depth of plow penetration.

The locking means 36 includes an approximately triangular plate-like locking member 38 pivotally mounted adjacent its apex to the frame 10 via a shaft 40 parallel to the shaft 28. The rocking movement of the locking member 38 about the shaft 28 is limited between first and second stop means 42 and 44, here shown as a single shaft 46 parallel to the shaft 40 and projecting from the frame 10 into the path of the locking member 38, the stop means 42 and 44 being formed by circumferentially spaced areas on the shaft surface. The first stop means 42 on the shaft 46 engages the locking member edge 48 at a first point 50 to establish one limit of the locking member movement, and the second stop means 44 engages the locking member edge 48 at a second point 52 to establish the other limit.

A pair of engaging members 54 and 56 are mounted on the locking member 38 and have cam surfaces 58 and 60 respectively which extend beyond the adjacent lateral edges 62 and 64 on opposite sides of the apex of the locking member 38. The cam surfaces face in the same general direction as the locking member edge 48. The engaging members 54 and 56 also have second cam surfaces 59 and 61 respectively on the opposite side of the engaging member from the cam surfaces 58 and 60.

The engaging members 54 and 56 are pivotally attached to the locking member 38 at one end by fasteners 66 and 68 respectively, and are removably attached at their other end to the locking member adjacent the edges 62 and 64 by fasteners 70 and 72 respectively. The fastener 70 is insertable through alternate bores 74 through the locking member 38 whereby the distance between the cam surface 58 and the shaft 40 can be selectively varied. Similarly, the fastener 72 is insertable through alternate bore 76 through the locking member to permit variation in the distance between the cam surface 60 and shaft 40.

The arm 26 carries a roller-type cam follower or lug 78 which projects from the arm and has an axis parallel to the shaft 28. When the locking member 38 seats against the stop means 42, as shown in FIG. 2, the cam follower 78 engages the cam surface 58 on the member 54 to limit the upward movement of the arm 26 relative to the frame 10. By inserting the fastener 70 through the desired bore 74 in the locking member 38 to determine the distance between the shaft 40 on the frame 10 and the cam follower 78 on the arm 26, the height of the wheel 22 relative to the frame 10 can thus be adjusted to vary the plowing depth.

In operation, when the frame 10 is revolved to position the right-hand plow unit 12 for operation, as shown in the drawings, the gauge wheel 22 moves downwardly by gravity until the arm 26 seats against the stop means 32. The locking member 38 then rotates by gravity in a counterclockwise direction in FIG. 2 until the edge 48 engages the first stop means 42 at the point 50. Since the arm 26 is resting against the stop means 32 in its lowest position, the engaging member 54 will clear the cam follower 78 to permit the rotation of the locking member 38 against the first stop means 42. As the frame is lowered to allow the plow unit 12 to penetrate the ground, the gauge wheel 22 engages the ground and swings upwardly relative to the frame in an arc about the shaft 28. When the frame is lowered to the predetermined plow depth, the cam follower 78 engages the cam surface 58. At this point the gauge wheel 22 supports the frame 10 via the axle 24, the arm 26, the cam follower 78, the engaging member 54, the locking member 38, and the shaft 40. Since a force exerted through a roller-type cam follower and a cam surface is directed along a line normal to the cam surface through the axis of the cam follower, the supporting force exerted through the cam follower 78 on the cam surface 58 is directed along a line which extends to the right of the shaft 40 in FIG. 2, tending to rotate the locking member in a counterclockwise direction about the shaft 40 and supplementing the counterclockwise gravity force of the locking member to insure the continued engagement of the locking member against the first stop means 42.

To position the left-hand plow unit 16 for operation, the frame is rotated about its longitudinal axis 180°. The effect of this rotation on the locking mechanism can best be seen by reversing FIG. 2. In this position, the gauge wheel is in an elevated position above the frame 10 and the locking member 38 is supporting only the weight of the gauge wheel 22 and the arm 26. While the weight of the gauge wheel still exerts a counterclockwise force on the locking member, the weight of the locking member 38 and the engaging members 54 and 56 now exerts a clockwise torque on the locking member about the shaft 40. The center of gravity and the weight of the locking member is such that the clockwise torque exceeds the counterclockwise torque exerted by the gauge wheel, causing the locking member to rotate in a clockwise direction. As the locking member rotates, the cam follower 78 moves outwardly relative to the cam surface 58 until the cam follower clears the engaging member, whereupon the gauge wheel 22 and arm 26 rotate in a counterclockwise direction about the shaft 28 until the arm engages the stop means 34, and the locking member 38 rotates in a clockwise direction about the shaft 40 until the locking member edge 48 engages the second stop means 44 at the point 52. If the locking member 38 reaches the stop means 42 before the arm 26 reaches the stop means 34, the cam follower 78 will engage the cam surface 61 on the reverse side of the cam surface 60, and the weight of the gauge wheel 22 acting on the cam surface 61 will raise the locking member 38 from the stop means 44 until the cam follower clears the engaging member 56, whereupon the locking member again seats against the stop means 42.

As in the reverse position, as the frame is lowered, the gauge wheel engages the ground and moves upwardly relative to the frame, and the cam follower 78 engages the cam surface 60 to limit the movement of the gauge wheel relative to the frame 10 and supports the frame with the plow unit 16 operating at a predetermined depth. The supporting force exerted on the cam surface 60 through the cam follower 78 is so directed that it exerts a clockwise torque on the locking member 38 to supplement the gravity force and maintain the locking member against the second stop means 44.

To again position the right-hand plow unit 12 for operation, the frame is again rotated 180° and the automatic unlocking and locking sequence of the gauge wheel is repeated.

Other features and advantages of the present invention will readily occur to those skilled in the art, as will many modifications and alterations in the preferred embodiment of the invention described herein, all of which may be achieved without departing from the spirit and scope of the invention.

What is claimed is:

1. In a two-way plow having alternate right- and left-hand plow units mounted on a frame selectively rotatable about a longitudinal axis between alternate positions to alternately dispose the plow units in an operating position, the improvement residing in a single gauge means for supporting the frame a predetermined distance above the ground when either plow unit is positioned for operation and comprising: an arm pivotally mounted on the frame for rocking movement about a transverse axis; a gauge wheel journaled on said arm for rotation about an axis parallel to the arm axis; first and second stop means mounted on the frame; a locking member rockably mounted on the frame for swinging between a first position, wherein it engages the first stop means, and a second position, wherein it engages the second stop means, the locking member swinging between its alternate positions in response to direction changes of the force of gravity thereon as the frame is rotated between its alternate positions; first and second engaging members mounted on the locking member and respectively engageable with the arm when the locking member is in its first or second positions and the frame is in one of its alternate positions to limit the upward swinging of the arm and gauge wheel mounted thereon relative to the frame, supporting the frame a predetermined distance above the ground, at least part of the supporting force exerted by said gauge wheel being transmitted to the frame through the arm, the first engaging member, the locking member, and the first stop means in one position of the frame and through the arm, the second engaging member, the locking member, and the second stop means in the other position of the frame.

2. The invention defined in claim 1 wherein the engaging members are mountable on the locking member in alternative positions to selectively vary the effective distance between the axis of the locking member rotation and the point of engaging member contact with the arm.

3. The invention defined in claim 2 wherein the engaging member has a cam surface and the arm includes a cam follower, which interengage to effect the engagement between the arm and the locking member and the force exerted through the cam surface and cam follower supplements the gravity force urging the locking member against the stop means.

4. The invention defined in claim 3 wherein the first and second stop means comprises a single shaft mounted on the frame and projecting into the rotational path of the locking member.

5. The invention defined in claim 3 and including stop means mounted on the frame for limiting the downward movement of the arm in either frame position to a point below the engaging position of the arm with the engaging member.

References Cited

UNITED STATES PATENTS

| | | | |
|---|---|---|---|
| 3,128,832 | 4/1964 | Habare | 172—212 X |
| 3,219,125 | 11/1965 | Wenzel | 172—225 |

OTHER REFERENCES

German printed specification: 1,056,409, April 1959.

ABRAHAM G. STONE, *Primary Examiner.*

J. R. OAKS, *Assistant Examiner.*